Patented June 29, 1954

2,682,487

UNITED STATES PATENT OFFICE 2,682,487

PENICILLIN CONTROL IN SUGAR EXTRACTION

Adrian S. Du Bois, Floral Park, N. Y., and Martin M. Reynolds, Old Greenwich, Conn., assignors to West Disinfecting Company, Long Island City, N. Y., a corporation of New York No Drawing. Application April 20, 1951, Serial No. 222,146

3 Claims. (Cl. 127—44)

This invention relates to improvements in the production of sugar, more particularly to a method of controlling bacterial contamination of sugar solutions during the processing of such solutions.

The two main sources of sugar are the sugar cane and sugar beets. The invention will be described illustratively as utilized in the production of sucrose from beet sugar but as will be shown hereinafter, it may be advantageously utilized in the production of cane sugar.

The process of producing sucrose from sugar beets is well known and comprises a series of relatively simple unit operations and unit processes. In the typical process the harvested beets are washed, weighed and sliced into narrow strips, called cossettes. The cossettes are charged to a diffusion battery consisting of a connected series of about twelve or more tanks or cells. The sugar is extracted from the cossettes by passing water at a temperature of about 160° F. to 175° F. countercurrently through the battery, the water being in contact with each cell for a period of from six to about eight minutes. The syrup recovered from the last cell of the battery is enriched in sucrose, containing of the order of 10 to 12 per cent sucrose, about two to about three percent ash and a variable amount of invert sugar.

The residual pulp from the diffusers is dried and sold as a cattle feed and the sugar solution is further processed to produce crystalline sugar. The diffusion liquor from the battery is screened to remove undesirable solid material and is then treated with milk of lime for a given period, usually about two hours, after which it is carbonated to saturation. This treatment with lime precipitates practically all the impurities and the carbon dioxide decomposes any calcium saccharate which was formed. The defecated syrup is then filtered and may be further limed and carbonated. The clarified pale yellow filtrate is then treated with sulfur dioxide which serves to decolorize the syrup and also to decompose organic acid salts of calcium and precipitating calcium sulfite. This solution is filtered and the clarified filtrate is evaporated in multiple effect evaporators. The concentrated syrup is grained in a vacuum pan. The crystals formed are separated in centrifugals, washed in the centrifugals and are then dried.

In such a process difficulties are encountered due to bacterial contamination. This contamination derives from soil and other bacteria that normally are associated with the plant, in addition to the contamination from extraneous bacteria which may be introduced into the plant. Such bacterial contamination is also encountered in the processing of cane sugar. These bacteria are of diverse character and tend to develop to a high concentration during the processing of the sugar solution. Thus it is established that as many as twenty different microorganisms may be present in the interior of an apparently sound sugar cane. Tests conducted at Java Experiment Station have demonstrated that the first mill juice may show 1,500,000 organisms per cc. while fourth mill juice may show a concentration as high as 5,000,000 organisms per cc. before washing down.

These bacteria have an undesirable chemical effect on the process. When the bacterial contamination assumes substantial proportion the acidity of the juice or diffusion liquor increases resulting in a not inconsiderable inversion of sugar and an undesirable increase in viscosity.

While the problem of bacterial contamination and its undesirable concomitants has been recognized for a long period, but few suggestions have been advanced to solve it, particularly insofar as inhibiting the chemical action of the normal bacteria in the juice is concerned. The art contains suggestions as to the use of antiseptics, such as electrolytic chlorine in the water used for washing down the equipment and recently it has been suggested to add formaldehyde to the diffusion liquor to inhibit bacterial action. Inasmuch as the ultimate product of the process is a comestible for which high standards of purity and flavor are demanded, it had been assumed in the past that the only inhibiting agents that might or could be used are volatile compounds, such as formaldehyde which would be evolved during evaporation and drying. This concept necessarily restricted the choice of bacterial agents and did not permit a choice based essentially on most effective bacteriocidal or bacteriostatic action.

It has now been found that the described bacterial contamination of sugar solutions may be effectively checked and controlled by introducing at an appropriate place in the circuit, an effective amount of an antibacterial of microbial origin.

It will be appreciated that such controlling agents are especially well suited to the purpose of the invention. These compounds, as for example penicillin, have remarkably high activity and are strikingly effective even in very high dilution. These antibiotics are also characterized by their specificity hence even highly complex contaminants may readily be controlled by using selected mixtures of antibiotics. The commercial production of these antibiotics have reached such a stage that they are suitable, from an economic standpoint, for a technological application as contemplated.

A further advantage of such antibiotics for the bacteriostasis of processed sugar solutions is that they are somewhat thermolabile and become inactivated under the thermal conditions obtaining during evaporation of the clarified syrup and drying of the crystals. There is thus no danger of developing an immunity to the antibiotic from continued ingestion of the sugar.

The concepts of the invention may be effectuated most simply. In the preferred operation under the invention the antibiotic such as penicillin is introduced in metered amounts to the fresh water passing to the first diffusion cell. If desired, of course, additional controlled amounts of the bacteriostatic agent may be admitted at other points in the diffusion battery as the circumstances of a particular operation warrent. The quantity of the antibiotic which is introduced into the circuit may be widely varied depending upon the intrinsic bacteriostatic effect of the agent or agents employed and the extent or degree of contamination of the sugar solution being processed. It will be found, for example, that of the order of 100,000 units of penicillin per ton of water entering the battery assures good bacteriostatic action effectively inhibiting the development of acidity in the diffusion liquor and commensurately minimizing the undesirable effects of such acidity.

It will be understood that the invention is not limited in its applicable scope to the use of penicillin but comprehends other similarly functioning antibiotics such as gramacidin and tyrocidin either alone or in bacteriostaticly balanced or synergized mixtures. Similarly it will be observed that this invention contemplates the use, where indicated, of antibiotics which are active against gram-negative bacteria such, for example, as streptothricin.

As noted previously, the invention may be utilized in the treatment of cane sugar with similar beneficial results. In such an operation the antibiotic is preferably added to the water or weak juices introduced into the first mill; it may, of course, be added at any other suitable step in the operation.

It will be understood that while preferred embodiments of the invention have been described, these are given to illustrate the underlying principles of the invention and not as restricting its useful scope to the particular illustrative embodiment.

We claim:
1. A method of processing sugar beets which comprises extracting cossettes with water containing of the order of 100,000 units of penicillin per ton of water.

2. A method of processing sugar beets which comprises extracting cossettes with water containing of the order of 100,000 units of penicillin per ton of water and subsequently heating the solution to temperatures sufficiently high to inactivate the penicillin.

3. A method of inhibiting the development of acidity in bacterial-contaminated aqueous diffusion solutions undergoing processing for the production of sugar which comprises adding to the diffusion solution prior to the heating thereof, of the order of 100,000 units of penicillin per ton of water in the solution and subsequently heating the solution to temperatures effective to inactivate the penicillin and concentrate the solution by evaporation.

References Cited in the file of this patent

UNITED STATES PATENTS

| Number | Name | Date |
|---|---|---|
| 137,746 | Wilkinson | Apr. 8, 1873 |
| 207,271 | Frezon | Aug. 20, 1878 |
| 1,016,762 | Moore | Feb. 6, 1912 |
| 1,476,152 | Delafond | Dec. 4, 1923 |
| 2,550,269 | Jensen et al. | Apr. 24, 1951 |

FOREIGN PATENTS

| Number | Country | Date |
|---|---|---|
| 395,527 | Great Britain | July 20, 1933 |
| 896,076 | France | Apr. 17, 1944 |

OTHER REFERENCES

Science News Letter, Jan. 21, 1950, page 46.
Sugar, Jan. 1951, page 50 (Zanni Abstract).
Sugar, Nov. 1947, pages 30, 31 and 32.
Jour. Amer. Med. Assn., Feb. 24, 1951, page 601 (2nd article, column 2).
Jour. Amer. Med. Assn., June 23, 1945, page 596.
Science, Nov. 1946, pages 460 and 461.
Wallerstein Labs. Communications, Aug. 1946, vol. 9, No. 27, pages 119 to 127.
Andersen et al., Reprint from Food Technology, 1950, vol. 4, No. 5, pages 188 to 189, 2 page reprint.